FTP8102 OR 3,668,525

United Stat
McGraw

[15] 3,668,525
[45] June 6, 1972

[54] COMMUNICATION SYSTEM

[72] Inventor: Robert E. McGraw, 1517 Sierra Gardens Drive, Roseville, Calif. 95678

[22] Filed: Mar. 12, 1970

[21] Appl. No.: 18,920

[52] U.S. Cl. ....................325/1, 325/3, 325/5, 325/6, 325/7, 325/9
[51] Int. Cl. ....................H04b 7/16
[58] Field of Search ....................325/1, 3, 5, 6, 7, 9, 12, 25, 325/15, 17, 13, 14; 343/175, 176, 177, 179; 331/38, 46, 49, 55, 56, 58

[56] References Cited

UNITED STATES PATENTS

| | | | |
|---|---|---|---|
| 3,209,258 | 9/1965 | Collins | 325/3 |
| 2,848,545 | 8/1958 | Mitchell | 325/9 |
| 3,535,636 | 10/1970 | Muilwijk | 325/25 |

FOREIGN PATENTS OR APPLICATIONS

| | | | |
|---|---|---|---|
| 684,693 | 12/1952 | Great Britain | 325/3 |
| 715,452 | 9/1954 | Great Britain | 325/3 |

*Primary Examiner*—Albert J. Mayer
*Attorney*—Naylor & Neal

[57] ABSTRACT

A communication system wherein a relay station comprising a single receiver and a single transmitter is adapted to selectively monitor a plurality of frequencies and transmit the monitored signal in one of a plurality of predetermined frequencies. To accomplish this end a sensing system is operated in conjunction with the receiver and transmitter to sense the incoming signal and lock the receiver and transmitter in an operating condition corresponding to the sensed incoming signal. Assuming that the receiver portion of the relay station is of an FM type, the squelch circuit thereof may be utilized in conjunction with the sensing device to lock the receiver on frequency.

5 Claims, 5 Drawing Figures

INVENTOR
ROBERT E. McGRAW
BY Naylor & Neal
ATTORNEYS

INVENTOR.
ROBERT E. McGRAW
BY Naylor & Neal
ATTORNEYS

INVENTOR
ROBERT E. McGRAW
BY
Naylor & Neal
ATTORNEYS

COMMUNICATION SYSTEM

BACKGROUND OF THE INVENTION

The present invention relates to a communication system, and more particularly, to a repeater system for selectively receiving a plurality of radio signals of different frequencies and for retransmitting the received signals.

In providing radio communication between two widely separated locations or locations located in terrain adversely affecting radio transmissions, it is common practice to establish one or more relay stations to relay transmitted signals between said locations. Quite often, such relay stations are used to receive and transmit on two frequencies or carrier channels, as when the station serves as a repeater between a distant station and mobiles in the area.

Two way radio prior art relay or repeater stations having a multifrequency capability usually incorporate therein a separate receiver for each frequency of signal received and a separate transmitter for each frequency of signal transmitted. Quite obviously, this duplication of equipment greatly increases the cost of a repeater station installation. Also, the duplication of equipment results in substantially twice the chances for station breakdown due to equipment failure as would be the case where a single receiver and a single transmitter were used to do the same job. This increase in cost and failure rate is compounded by the fact that it is customary to provide each transmitter employed on the repeater station with a separate antenna. Although systems have been devised to allow switchover of different transmitters to a single antenna resultant operating inefficiencies make this approach undesirable in many instances.

SUMMARY OF THE INVENTION

It is therefore an object of the present invention to provide a communication system for relaying signals between separate locations which is characterized by its lower cost and simplicity, as compared to prior art apparatus.

It is a further object of the present invention to provide a communication relay system wherein a single receiver and a single transmitter may be utilized to respectively receive and transmit radio signals of differing frequencies.

These and other objects have been attained in accordance with the teachings of the present invention by providing a communication relay system incorporating a single receiver and a single transmitter for the selective reception or transmission of radio signals of differing frequencies wherein a sensing system is continually operable to sequentially sense all received frequencies. Upon detection of an incoming signal upon one of the received frequencies, as though an operative connection with the receiver squelch circuit, the sensing device locks the receiver on the proper frequency. Subsequently, the transmitter which is operatively associated with the receiver is also locked on a preselected transmit frequency. The system is readily adapted to use with presently utilized mobile units and control stations without substantial modification thereof. No tones on coding of any other kind are required for the proper operation of this system.

DESCRIPTION OF THE DRAWINGS

The above-noted and other objects of this invention will be understood from the following description taken with reference to the drawings wherein.

DESCRIPTION OF A PREFERRED EMBODIMENT

Figure 1:
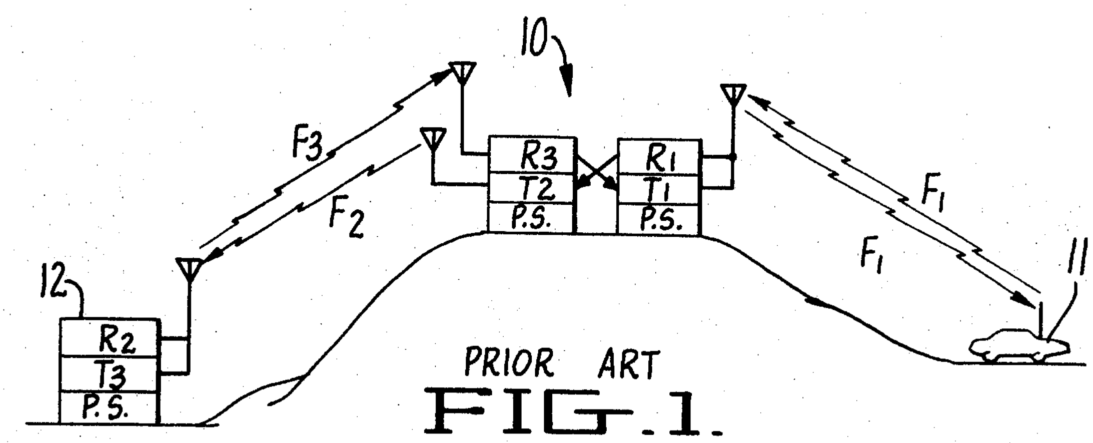
FIGS. 1 and 2 are diagramatic presentations illustrating the use of typical prior art dual repeater systems.

FIG. 1 illustrates a typical working context wherein a dual two way repeater system is commonly utilized. The system, which is generally indicated by reference numeral 10, is adapted to repeat or relay signals between two separate locations, such as the indicated mobile unit 11 and the control station 12. The repeater system 10 which is illustrated is of the commonly used prior art dual or double repeater type. In such a system, a signal is received by one receiver R 1 from mobile unit 11, for example, and fed to a transmitter T 2 which retransmits the received signal to the control station on a frequency F 2 which differs from the frequency F 1 employed between mobile unit 11 and receiver R 1. A radio signal returned from the control station 12 is transmitted on yet another frequency F 3 by station transmitter T 3. Signal F 3 is received by the repeater system on a receiver R 3 which feeds the signal to transmitter T 1 for retransmission to the mobile unit 11 on frequency F 1.

Figure 2:
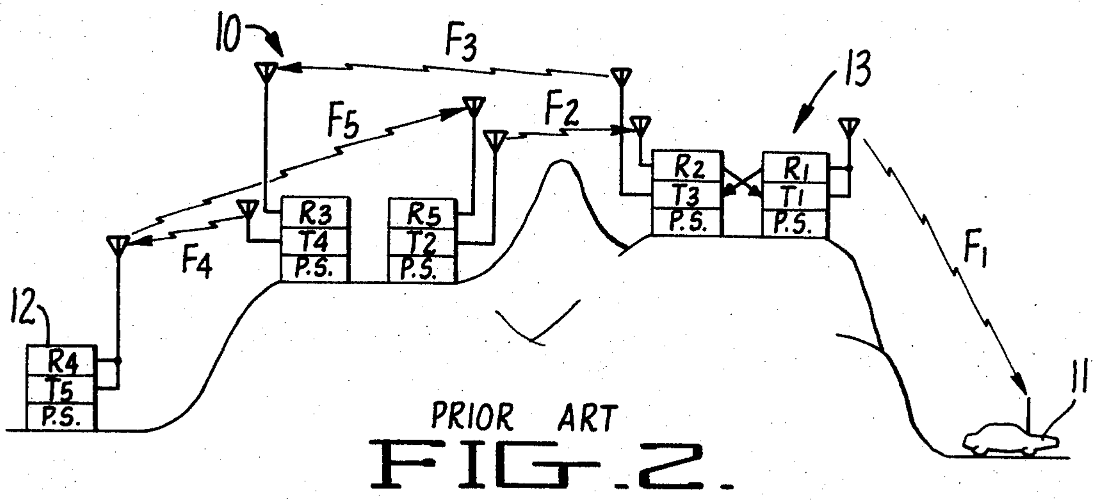

From the above, it may be seen that the prior art dual or double repeater systems utilize a separate receiver and transmitter for signals directed to and from one location and signals directed to and from another location serviced thereby. This duplication of equipment is compounded in another repeater system operating context which is illustrated in FIG. 2. In this arrangement, in addition to remote control station 12, dual repeater system 10 and a station such as mobile unit 11, still another dual repeater system 13 is utilized. Two or more dual repeater systems between the ultimate transmission points may be required because of the terrain, distance between the points, etc., with the relayed signals being transmitted between the dual repeater systems and received thereby between the ultimate transmission and receiving stations such as mobile unit 11 and control station 12.

Figure 3:
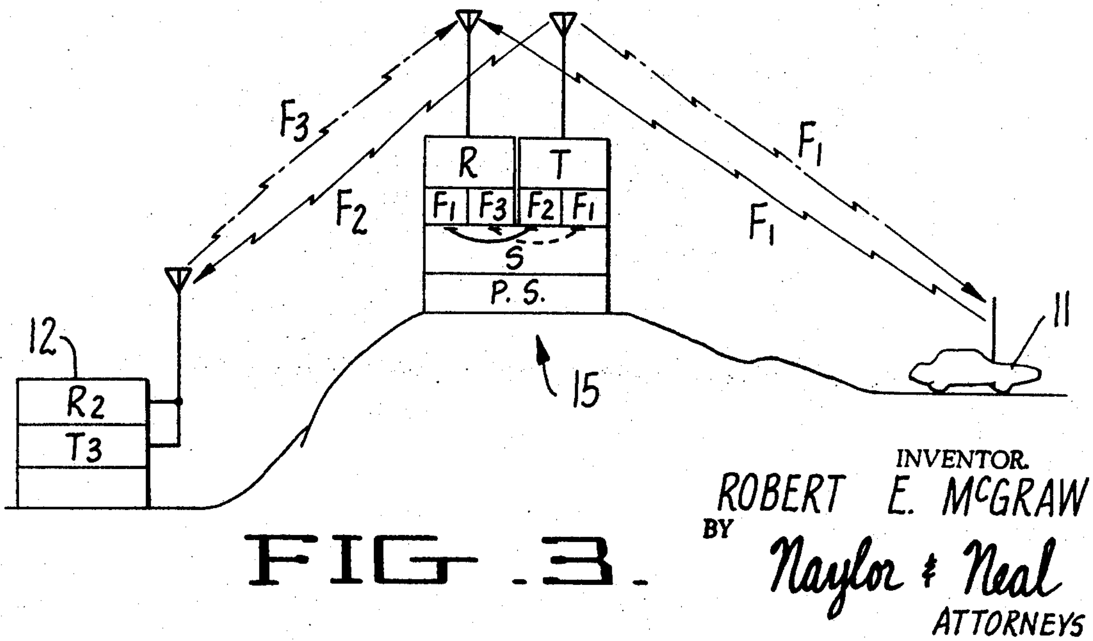
FIG. 3 is a diagramatic presentation illustrating the use of the communication relay system constructed in accordance with the teachings of the present invention.

FIG. 3 is a view similar to FIG. 1 but illustrating a two way radio relay system constructed in accordance with the present invention being utilized in place of the prior art dual or double repeater system. Rather than incorporating two sets of receivers and transmitters, it may readily be seen that the communication relay system according to the present invention (indicated generally by means of reference numeral 15) incorporates but one receiver R and one transmitter T to carry out the dual repeater or relay function. In a manner which will be more readily apparent with reference to the detailed description of the system below, the single receiver R and the single transmitter T are utilized in conjunction with a sensing device S in such a manner as to give them automatic multifrequency selecting capabilities. In other words, with the present system receiver R is adapted to receive signals from both mobile unit 11 and control station 12 in spite of the fact that such frequencies (here designated as F 1 and F 3) are different. In like manner, the transmitter T of communication relay system 15 is adapted to transmit to both mobile unit 11 and control station 13 on frequencies which differ from one another.

Figure 4:
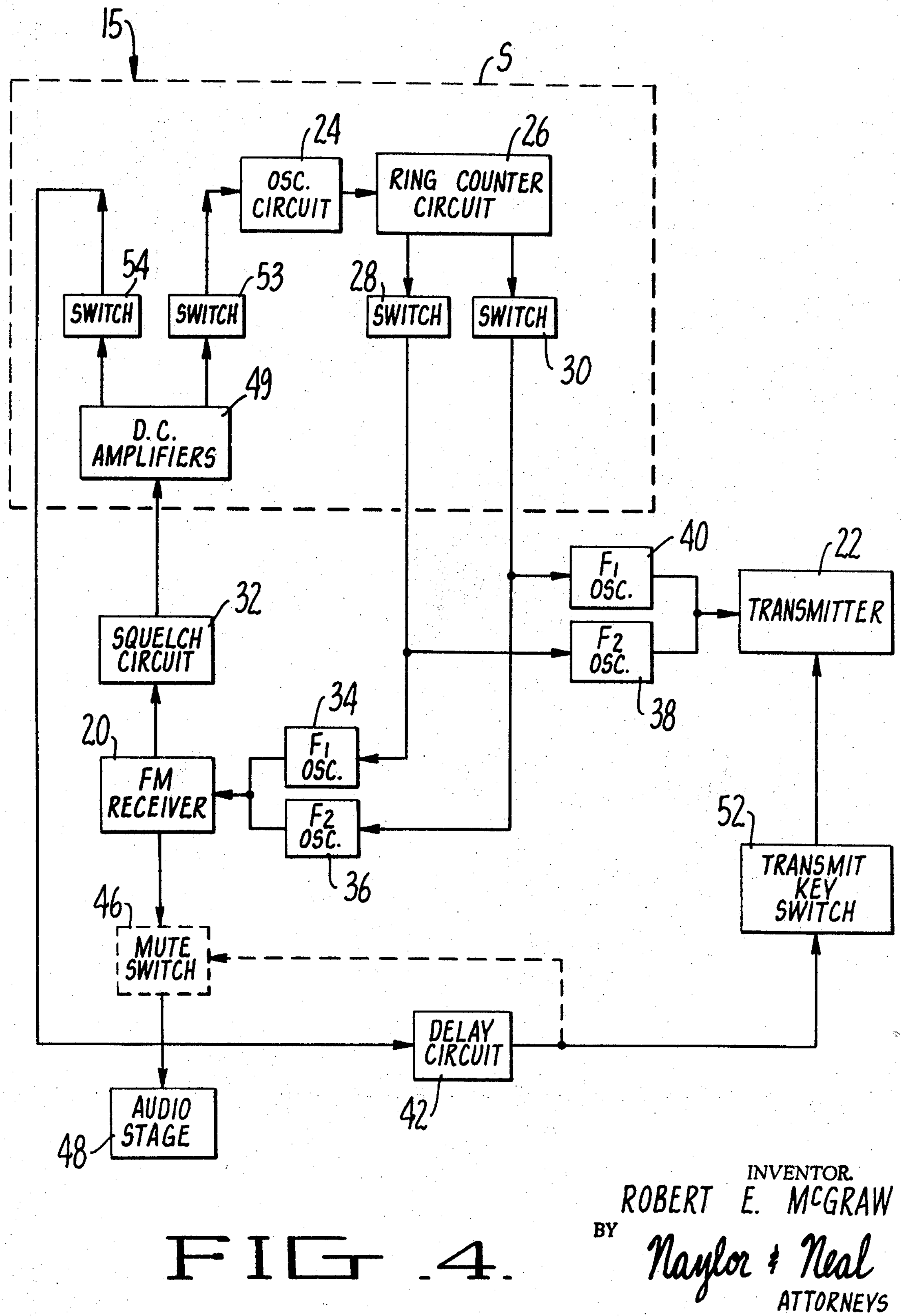
FIG. 4 is a block diagram of this invention.

How this is accomplished may readily be seen with reference to FIG. 4 wherein the principal components of the communication relay system 15 constructed in accordance with the present invention, and the interrelationship therebetween, are illustrated in the form of a block diagram. Basically, the communication relay system of the present invention incorporates therein one FM receiver 20 having multifrequency capabilities and one transmitter 22 which also has multifrequency capabilities. Since receivers and transmitters of the multifrequency type are known in the art, FM receiver 20 and transmitter 22 have not been described in detail. A sensing device S is disposed in a common electrical circuit with both the FM receiver 20 and transmitter 22. The sensing device S includes an oscillator 24, a ring counter circuit 26 driven by said oscillator circuit 24 and a pair of switches 28 and 30 which are selectively actuated by the ring counter circuit so that only one switch is closed and in circuit at a time.

The oscillator circuit 24 is connected to the output of a squelch circuit 32 which is of conventional design comprising a portion of the FM receiver circuitry through a DC amplifier circuit 49. The squelch circuit or quieting system is a conventional component of FM two way receiver circuitry. Such a circuit utilizes the noise from either the tubes or transistors of the receiver to turn off the audio stage when a desired signal is not present in the receiver. Such circuits customarily incorporate a filter stage to separate the noise from a desired signal. The noise is then channeled to amplifiers where it is amplified for subsequent rectification whereby the noise signal is used to turn off the audio amplifier when a desired signal is not present in the receiver. In the prior art the noise developed voltages of the squelch circuit and the voltages developed after the last 1 F filter when a desired signal is present are utilized to key the transmitter of a dual repeater system of the type described above.

According to the teachings of the present invention, however, the output voltages of the squelch circuit 32 are used through the action of oscillator circuit 24, to stabilize the ring counter circuit 26. Sensing device S through operation of the ring counter circuit 26 continually senses all of the desired frequencies and upon application to oscillator circuit 24 through the DC amplifiers and switch 53 of voltages from squelch circuit 32 indicating that a signal is received, the ring counter circuit 26 will stabilize and lock the receiver onto the frequency being received.

In the arrangement disclosed in FIG. 4 it will be assumed for purposes of illustration that FM receiver 20 is designed so as to receive either of two frequencies, F 1 or F 2. In the event that the frequency F 1 is the frequency that is sensed by the sensing device when a signal is received and recognized based upon the voltage output of squelch circuit 32, switch 28 will be closed and switch 30 will be open. Switch 28 upon the closing thereof locks the operating circuitry of FM receiver 20 F 1 oscillator 34 so that the receiver may receive only signals having a frequency F 1 which is the sensed frequency As may clearly be seen with reference to the block diagram of FIG. 4, the closing of switch 28 has the dual function of interposing in the operating circuitry of transmitter 22 transmitter F 2 oscillator 38 so that the transmitter 22 will transmit only on frequency F 2. Frequencies F 1 and F 2 are preselected, so that they are sufficiently far apart to avoid the possibility of interference between the transmitter and receiver during the relay function, as in prior systems.

For the purposes of illustration it will now be assumed that F 2 was the circuit in operation when a signal was sensed by the system senser S. If such were the case, switch 30, rather than switch 28 would be closed, thereby locking the FM receiver circuitry F 2 oscillator 36 so that the receiver would receive signals on the desired frequency. With respect to the transmitter 22, the F 1 oscillator 40, rather than the F 2 oscillator 38, would be interposed in the transmitter circuit. The FM receiver 20 in this instance would therefore be receiving on frequency F 2 and the transmitter 22 would be transmitting on frequency F 1.

It should be understood that the oscillators 34 and 36 are part of the receiver and that oscillators 38 and 40 are part of the transmitter. These oscillators are not part of the improvement of the present invention, but rather are conventional. They have been shown in blocks separate from the receiver and transmitter for the sake of illustration only.

The oscillators 34 and 36 are connected to the first mixer of the receiver, as is the standard in the art today. Whichever oscillator 34 or 36 is grounded through the present invention, as will become more apparent from the subsequent discussion, determines which frequency, F 1 or F 2, may be received at a given time.

Through a suitable output associated with squelch circuit 32 the control signal is routed through a delay circuit 42 to the transmitter 22 through the DC amplifiers and switch 54 as illustrated diagrammatically in FIG. 4. Delay circuit 42 serves to delay the keying of the transmitter for a time sufficient to make certain that such transmission does not occur prior to absolute locking on frequency of FM receiver 20 to preclude the possibility that the transmitter could possibly go on the air while frequencies were still being switched after stabilization of the ring counter circuit 26. Delay circuit 42 may interpose a lag in order of 0.5 seconds in the signal before allowing the transmit key switch to place the transmitter on transmit mode.

As indicated in FIG. 4 an audio mute circuit 46 may be provided between the audio stage 48 and the remainder of the FM receiver circuitry. The incorporation of an audio mute circuit is especially desirable in tube-type receivers where higher operating voltages may result in an audible pulsing due to the operation of the sensing device. The mute is preferably interposed in the system circuitry in such a manner that the audio stage 48 is cut out until both the receiver 20 and the transmitter 22 are locked on frequency. This may be done quite readily by connecting the control lead of the mute circuit to the output of delay circuit 42 of the same as the transmitter keying circuit.

Figure 5:
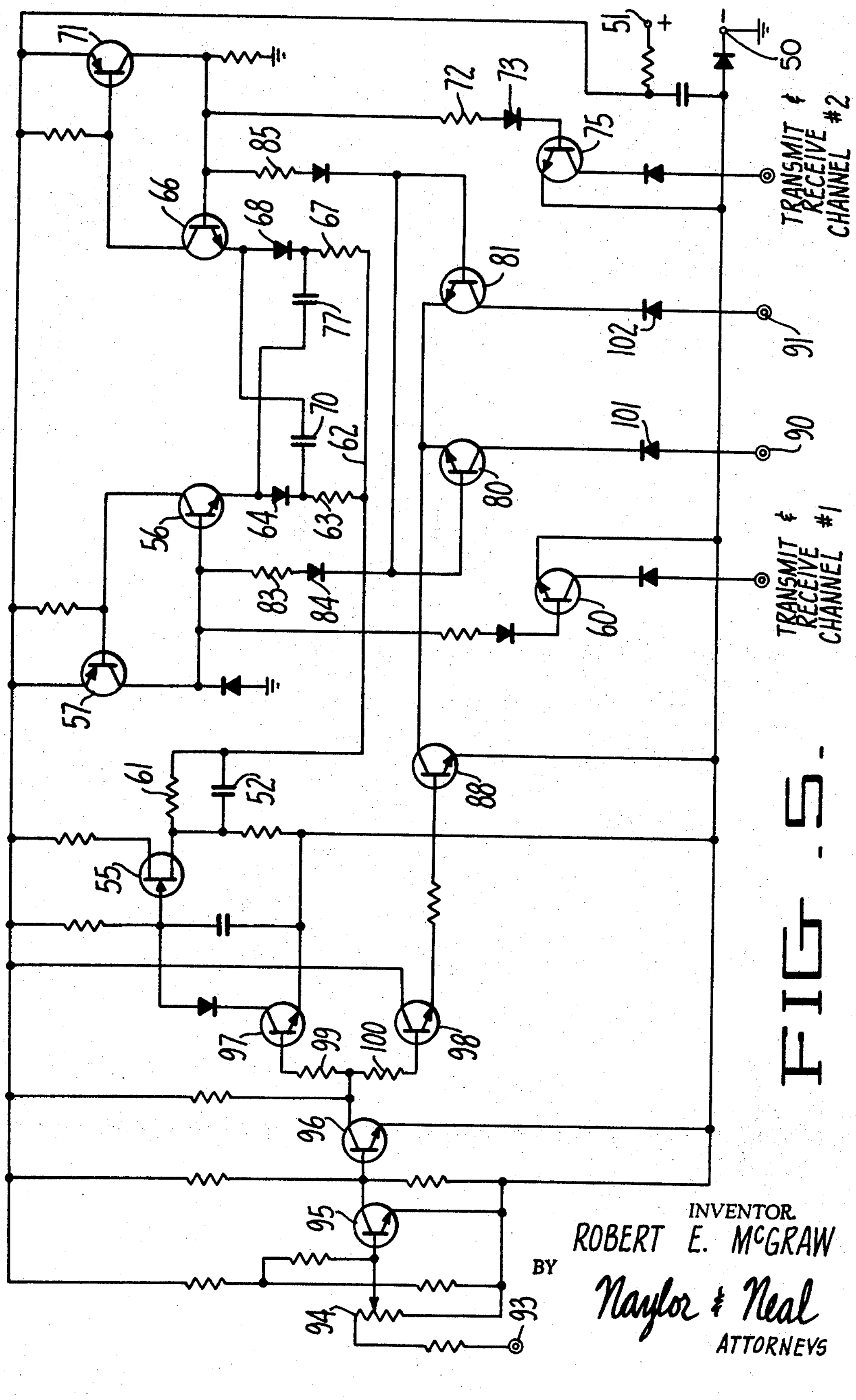
FIG. 5 is a schematic diagram illustrating details of the circuitry employed in a preferred form of communication relay system constructed in accordance with the teachings of the present invention.

Illustrated in FIG. 5 is one form of sensing circuitry suitable for employment in the communication relay system constructed in accordance with the teachings of the present invention. Upon application of a supply voltage across terminals 50 and 51 a charge is built up across condenser 52. In combination with pulse output and pulse timer unijunction transistor 55, condenser 52 upon charging thereof energizes a transistor 56. Transistor 56 upon passage of current therethrough energizes transistor 57. Due to the series interconnection between transistors 56 and 57, transistor 57 operates to lock transistor 56 in an energized state. Locking of transistor 56 in this manner completes a circuit through transistor switch 60, connecting a ground to transmit and receive channel 1 to lock the receiver on this channel frequency.

Upon energization of the sensing circuit through application of an operating voltage across terminals 50 and 51 unijunction transistor 55 starts to oscillate at a predetermined rate, applying a positive voltage pulse through resistor 61 and line 62 to both transistors 56 (through resistor 63 and diode 64) and transistor 66 (through resistor 67 and diode 68). The positive pulse serves to switch off whichever of the two transistors 56 or 66 that is in an energized state at the time of the pulse. In the foregoing description the assumption was made that transistor 56 was the transistor of the two which assumed an energized state upon application of an operating voltage across terminals 50 and 51; accordingly, the pulse would serve to switch transistor 56 off. The de-energization of transistor 56 releases transistor switch 60 which means that transmit and receive channel 1 is no longer being grounded.

In the process of switching off, the transistor 56 circuitry applies a negative voltage to the emitter of transistor 66 through condenser 70 thereby switching on said transistor. When transistor 66 is in an energized state it in turn applies a voltage to transistor 71 which operates as a locking switch to lock transistor 66 in an energized condition. Transistor 66 while it is energized directs a positive voltage through resistor 72 and diode 73 to the base of second transistor switch 75 to establish a ground to transmit and receive channel 2.

The next positive pulse applied through resistor 61 to the common pulse line 62 will de-energize transistor 66, in turn releasing transistor 75, so that transmit and receive channel 2 will be in an ungrounded condition. Upon the de-energization of transistor 66 a negative voltage will be applied through condenser 77 back to the emitter of transistor 56. This voltage will energize transistor 56 and the cycle described above will repeat continuously as long as operating voltage is established between terminals 50 and 51.

The oscillator 24 described with reference to FIG. 4 will now be described with reference to FIG. 5. While not designated in FIG. 5, it should be understood that the oscillator 24 consists of unijunction transistor 55 connected to a pulse output as follows.

The resistor and capacitor in the emitter control the timing of the output pulse. It may be seen that the resistor and capacitor are in series across the supply voltage with the emitter of the unijunction transistor 55 connected at their common junction. When 12 volts is applied to the unit, the capacitor begins to charge, attempting to equal that voltage. The resistor connected in series controls the time it takes for the capacitor to charge. When the voltage across the capacitor reaches approximately 8 volts, unijunction transistor 55 reaches peak point and fires and the voltage across the capacitor is reduced to approximately 0 volts. At this point, the unijunction transistor 55 cuts off and the process is repeated. Each time the unijunction transistor fires, a pulse is produced in the base one circuit across the resistor between base one and ground. This pulse is applied through condenser 52 to the common line. This is the pulse that controls the switches.

The same voltages utilized to energize transistors 60 and 75 are applied to transistors 80 and 81 — to transistor 80 through resistor 83 and diode 84 and to transistor 81 through resistor 85 and diode 86. Transistor 88, however, which is in a de-energized condition during this stage of operation of the sensing device, blocks transistors 80 and 81 in an inoperative condition since the emitters thereof connect to ground only through the transistor 88. The operation of this latter transistor will be described in greater detail below and it is only necessary at this juncture to note that such transistor is in a de-energized state during this point of the operation of the sensing device. The transistor 80 when eventually energized, as will also be described in greater detail below, provides an electrical ground to the transmitter keying circuitry (not shown) in conjunction with transistor 80 through terminal 90. Transistor 81, on the other hand, when energized, directs an electrical ground to the receiver audio mute circuitry (not shown) through terminal 91. In other words, as long as transistors 80 and 81 remain inoperative the associated transmitter remains unkeyed and the receiver audio stage is muted if necessary.

In the foregoing description it has been assumed that the sensing device has not detected an incoming signal on one of the two frequencies being monitored. The operation of the sensing device circuitry will now be described when such an incoming signal is sensed. As previously stated, this may readily be accomplished by placing the senser in operative association with the receiver squelch circuitry since such circuitry is a commonly used expedient on FM receivers. However, it should be kept in mind that the sensing device may be tapped to any other convenient voltage source where a change can be noted if desired. The sensing device illustrated in FIG. 5 has been designed to present a very high resistance to the circuit it is connected to. It is anticipated that the sensing unit may be employed in combination with transistor circuits which are normally low resistance devices, or tube-type circuits which are very high resistance devices. In addition, to accommodate the sensing device to use with different input voltages a variable resistance arrangement has been provided. The scanner detects the presence of an incoming signal on one of the desired frequencies by receiving a positive signal at terminal 93. This signal passes through a variable resistor 94. The positive signal from the receiver squelch circuit or any other desired source is received by transistor 95 which operates as a DC amplifier and impedance matching device. After amplification of the signal by transistor 95 it is applied directly to the base of transistor 96 which serves to further amplify same. The twice amplified signal is then applied to the bases of two transistors 97 and 98 through resistors 99 and 100, respectively.

As the signal is applied to transistor 97 the transistor performs a switching operation and applies a ground to the pulse amplifier 55, de-energizing same. It should again be noted that transistor 55 is required to provide the pulse that is applied to line 62 to de-energize whichever of the two transistors 56 or 57 is in an active state at that time. Since transistor 55 is now placed in an inoperative state, whichever of the two transistors 56 and 57 was active when the signal was received stays energized. Consequently, whichever of the transmit and receive channels, 1 or 2, was grounded at that stage will remain grounded.

As noted above the amplified incoming signal is also applied to the base of transistor 98. Due to the fact that transistor 88 is disposed between the emitter of transistor 98 and ground, transistor 98 requires a slightly higher voltage (in the order of 0.8 volts, for example) than does transistor 97 to operate. When the signal reaches the slightly higher voltage, transistor 98 is actuated and allows a positive voltage from the collector thereof to be applied to a transistor 88. Transistor 88 then performs its switching operation and permits transistors 80 and 81 to complete their respective circuits through transistor 88. As has been mentioned earlier, transistor 88 operates as the blocking switch when transistors 80 and 81 had applied thereto the same voltage as applied to transistors 60 and 75 when they were selectively energized. Energization of transistor 80 grounds the transmitter keying circuit at point 90 and the transmitter is turned on. Energization of transistor 81 results in the de-actuation of any receiver muting circuit which is operatively associated therewith if necessary and the desired audio will now be heard by the operator. The requirement that transistor 98 take a slightly higher voltage to operate than does transistor 97 assures that the transmit and receive channel frequencies will be positively locked before the transmitter is activated. It is noted that the original channel selection is automatic. At the instant voltage is applied to the unit neither channel is grounded through the transistor switches 60 or 75. When voltage is applied to the unit and builds up across the various components, starting is automatic. The components in the F 1–F 2 circuitry are inherently dissimilar, causing either F 1 or F 2 to operate first as voltage rises. From this point on, the pulser has control of automatic turnoff of whichever circuit is on if a signal is not present on the grounded channel.

Although the schematic of FIG. 5 illustrates a sensing device arrangement whereby two frequencies may be monitored, it will be obvious to one skilled in the art that the basic design may be readily adapted to handle more than two frequencies. This may be done simply by adding on to the sensing device a four-transistor circuit similar to those described for the two illustrated frequencies for each new frequency capability. As a general comment concerning the disclosed circuit, it should be pointed out that the many diodes utilized serve two primary purposes in general, i.e., as temperature compensators wherein highly sensitive circuits are affected by temperature and as blocking diodes where sensitive circuits may be destroyed by accidentally applying a voltage of the wrong polarity. The noted exceptions to this are diodes 101 and 102. Since the emitters and bases of transistors 80 and 81 are tied together and the same signal is used to activate them, the diodes are used to keep the switched circuits from affecting one another or affecting the transistors that actuate them.

From the foregoing description it will be readily apparent to those skilled in the art that various changes and modifications may be made in the illustrated embodiment without departing from the spirit of the invention or the scope of the subjoined claims.

I claim as my invention:

1. A communication relay system for the reception and transmission of radio signals, said system comprising, in combination:

- a receiver adapted to selectively receive radio signals on a plurality of preselected frequencies;
- a transmitter adapted to selectively transmit radio signals on a plurality of preselected frequencies, and
- a sensing device cooperating with said receiver and transmitter including means adapted to sense a voltage amplitude change in the receiver when an RF signal is present on one of said preselected frequencies and upon thus detecting an incoming signal on one of said preselected frequencies to lock said receiver on the frequency of said detected incoming signal and against the receipt of incoming signals on said preselected frequencies which are different from the detected signal so long as the first detected signal is present and key said transmitter for operation on one of said preselected frequencies, said one frequency being different from that one which the receiver is operating.

2. The communication system of claim 1 wherein said sensing device includes switching means connected to said transmitter and receiver for locking said transmitter and receiver on different operating frequencies when said incoming signal is detected and keying the transmitter.

3. The communication system of claim 1 wherein said receiver is frequency modulated and includes a squelch circuit, said sensing device being connected to an output of said squelch circuit to determine the existence of an incoming signal on one of said preselected frequencies.

4. A sensing device for use in a relay communication system including a receiver adapted to selectively receive radio signals on a plurality of preselected frequencies and a transmitter adapted to selectively transmit radio signals on a plurality of preselected frequencies wherein in operation signals are received on one frequency and transmitted on another, said sensing device comprising:

an oscillator circuit;

frequency channel selecting means driven by said oscillator circuit for sensing a voltage amplitude change in the receiver when an RF signal is present on one of said preselected frequencies and thus detecting the presence of an incoming signal on one of said preselected frequencies; and means responsive to the detection of the presence of an incoming signal to lock said frequency channel selecting means against further sensing so long as the first detected signal is present.

5. The sensing device of claim 4 further comprising switch means responsive to the locking of said sensing circuit to operate said receiver on the frequency of said detected signal and to key said transmitter for operation on one of said predetermined frequencies.

* * * * *